(12) United States Patent  
Suyama et al.

(10) Patent No.: US 9,225,188 B2  
(45) Date of Patent: Dec. 29, 2015

(54) CHARGING SYSTEM

(75) Inventors: Atsushi Suyama, Moriguchi (JP);  
Toshiya Iwasaki, Moriguchi (JP);  
Atsushi Shimizu, Moriguchi (JP);  
Hirotsugu Murashima, Moriguchi (JP);  
Jun Yamasaki, Moriguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 279 days.

(21) Appl. No.: 13/637,439

(22) PCT Filed: Aug. 23, 2011

(86) PCT No.: PCT/JP2011/068951  
§ 371 (c)(1),  
(2), (4) Date: Dec. 11, 2012

(87) PCT Pub. No.: WO2012/026458  
PCT Pub. Date: Mar. 1, 2012

(65) Prior Publication Data  
US 2013/0076297 A1 Mar. 28, 2013

(30) Foreign Application Priority Data  
Aug. 23, 2010 (JP) ................. 2010-185822

(51) Int. Cl.  
*H02J 7/00* (2006.01)  
*B60L 11/18* (2006.01)  
(Continued)

(52) U.S. Cl.  
CPC ............. *H02J 7/0054* (2013.01); *B60L 11/184* (2013.01); *B60L 11/1844* (2013.01);  
(Continued)

(58) Field of Classification Search  
USPC .................................. 320/103, 109  
See application file for complete search history.

(56) References Cited

U.S. PATENT DOCUMENTS

| 6,034,443 | A | * | 3/2000 | Oliemuller et al. ............. 307/70 |
| 2002/0070705 | A1 | | 6/2002 | Buchanan et al. |
| 2008/0067974 | A1 | * | 3/2008 | Zhang et al. ................... 320/104 |

FOREIGN PATENT DOCUMENTS

| JP | 11-221739 A | 8/1999 |
| JP | 2001-069678 A | 3/2001 |

(Continued)

OTHER PUBLICATIONS

International Search Report issued in International Patent Application No. PCT/JP2011/068951 dated Nov. 8, 2011.

*Primary Examiner* — Samuel Berhanu  
(74) *Attorney, Agent, or Firm* — McDermott Will & Emery LLP (57) ABSTRACT

[Problem] To provide a charging system that levels the amount of grid power that is used, and that is capable of reducing power rates, even if charging has been frequently conducted without limiting the time zones in which charging is conducted. [Solution] A charging system is provided with: a storage unit that is charged by consuming grid power supplied by a power company, and that supplies the stored power through discharge; and a charging unit that charges batteries by consuming power supplied by grid power and the storage unit. Power companies set a power rate that is higher the greater the maximum value of the amount of power supplied for each unit of time is. Furthermore, at least a single charge carried out by the charging unit is carried out over two units of time, and the storage unit supplies power to the charging unit in at least one unit of time other than said two units of time.

5 Claims, 8 Drawing Sheets

(51) Int. Cl.
*H01M 10/44* (2006.01)
*H02J 3/32* (2006.01)

(52) U.S. Cl.
CPC ............ *H01M 10/44* (2013.01); *H02J 3/32* (2013.01); *B60L 2230/16* (2013.01); *B60L 2230/22* (2013.01); *B60L 2250/10* (2013.01); *B60L 2250/16* (2013.01); *Y02E 40/76* (2013.01); *Y02E 60/721* (2013.01); *Y02T 10/7005* (2013.01); *Y02T 10/7088* (2013.01); *Y02T 10/92* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 10/545* (2013.01); *Y04S 30/14* (2013.01)

(56) References Cited

FOREIGN PATENT DOCUMENTS

| | | |
|---|---|---|
| JP | 2007-535282 A | 11/2007 |
| JP | 2008-067418 A | 3/2008 |

\* cited by examiner

CHARGING SYSTEM

RELATED APPLICATIONS

This application is the U.S. National Phase under 35 U.S.C. §371 of International Application No. PCT/JP2011/068951, filed on Aug. 23, 2011, which in turn claims the benefit of Japanese Application No. 2010-185822, filed on Aug. 23, 2010, the disclosures of which Applications are incorporated by reference herein.

TECHNICAL FIELD

The present invention relates to a charge system that charges a battery and the like disposed in an electric vehicle.

BACKGROUND ART

In recent years, a power storage battery is going large, studied so as to be used for: driving of electric vehicles such as an electric car, an electric bike and the like; and storing power that is consumed in households, stores, buildings and the like, and is expected to be widespread in the future. Besides, from the viewpoint of reduction in emission amount of carbon dioxide and the like, an electric vehicle is desired to be widespread.

For the spread of an electric vehicle, the spread of a charge system, which charges a power storage battery (hereinafter, called a battery) for driving an electric vehicle, is inevitable. Especially, the spread of a charge system, which charges a battery of an electric vehicle outside a household, is inevitable. Regarding this, a plan is proposed so as to dispose a charge system at stores such as a convenience store and the like.

In a case where a charge system is disposed at a store and the like, besides power that is consumed by various apparatuses such as an illumination device, an air conditioner, a refrigerator and the like, it is also necessary for the store and the like to supply power that is consumed by the charge system. The power consumed by a charge system is likely to be equal in amount to (e.g., substantially equal to each other in the order of power) the power consumed by various apparatuses in a store and the like. Because of this, the power amount which a store and the like purchase from an electric power company increases, which becomes a problem that the power rate increases, and the problem is likely to become a cause that discourages the spread of a charge system.

Accordingly, for example, a patent document 1 proposes a charge system, which preferentially uses a time zone where a unit power rate is inexpensive and a time zone where power is in less demand, thereby reducing the power rate.

CITATION LIST

Patent Literature

PLT1: JP-A-2008-67418

SUMMARY OF INVENTION

Technical Problem

According to the charge system proposed by the patent document 1, it is impossible to decrease the power rate without performing a charge during time zones such as late night, early morning and the like which are inconvenient and limited. However, it is conceivable that there are few cases where an electric vehicle user (hereinafter, simply called a user) comes to a store and the like at late night, in early morning and the like that are inconvenient time zones to perform a charge. Besides, in contrast, during time zones such as daytime and the like that are convenient for the user, it is conceivable that many electric vehicles come to a store and the like; accordingly, it becomes necessary to frequently perform a charge. Accordingly, it becomes hard to decrease the power rate by means of the above charge system.

Accordingly, it is an object of the present invention to provide a charge system that does not set a limit on a time zone where to perform a charge and allows reduction of a power rate even if a charge is frequently performed.

Advantageous Effects of Invention

According to the structure of the present invention, the system power amount consumed by the one charge of the charge portion is distributed to the two unit time durations. Besides, during the other unit time durations, by consuming the power supplied by the discharge from the power storage portion, the charge portion performs the charge. Because of this, even in a case where the charge portion needs to frequently perform the charge, it becomes possible to decrease the maximum value of the system power amount consumed during the unit time duration. Accordingly, it becomes possible to decrease the power rate.

The significance and effects of the present invention will be more apparent from embodiments described hereinafter. However, the following embodiments are each an embodiment of the present invention, and the present invention and the meaning of a term of each constituent element are not limited to those described in the following embodiments.

DESCRIPTION OF EMBODIMENTS

A charge system according to an embodiment of the present invention is described hereinafter with reference to drawings. First, an example of a structure and operation of the charge system according to the embodiment of the present invention is described with reference to drawings.

<Charge System>

Figure 1:
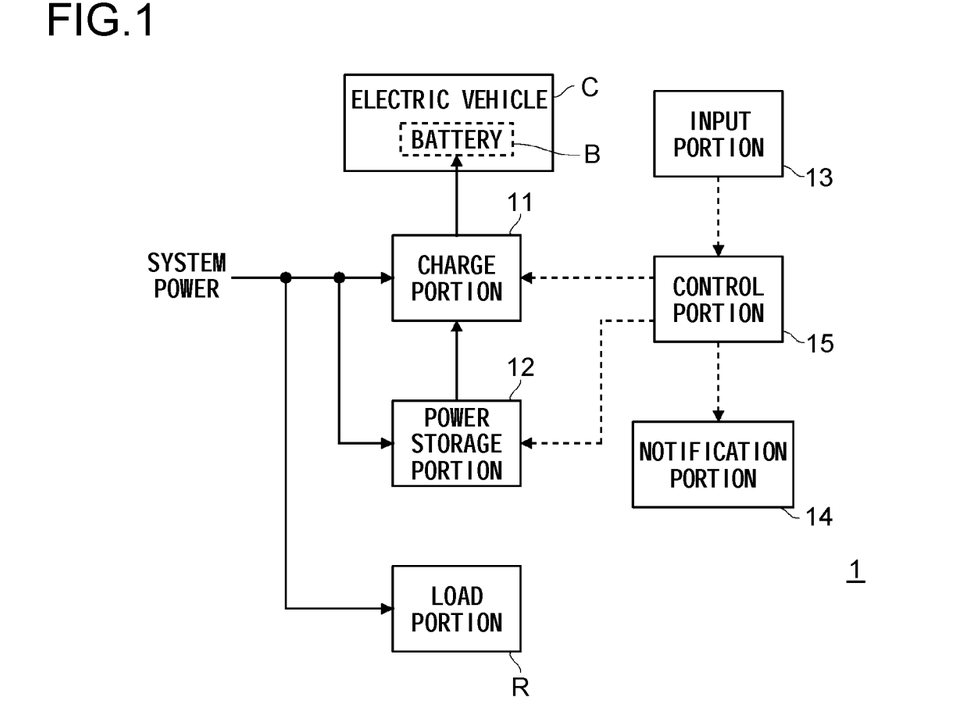
FIG. 1 is a block diagram showing a structural example of a charge system according an embodiment of the present invention.

FIG. 1 is a block diagram showing a structural example of the charge system according the embodiment of the present invention. Here, a solid-line arrow, which connects blocks in the figure to each other, shows a flow of power, and a broken-line arrow shows a flow of information.

The charge system 1 shown in FIG. 1 includes: a charge portion 11 that consumes supplied power, supplies power to and charges a battery B disposed in an electric vehicle C; a power storage portion 12 that stores supplied power and supplies the power by means of a discharge; an input portion 13 into which a command from a user is input; a notification portion 14 that gibes notice to the user; and a control portion 15 into which the command from the user is input from the input portion 13 and which controls operation of the charge portion 11 and the power storage portion 12. In the meantime, hereinafter, the charge of the battery B of the electric vehicle C by the charge portion 11 is called a battery charge and the charge of the power storage portion 12 is called a power storage portion charge, whereby these are distinguished from each other. Besides, the discharge from the power storage portion 12 is called a power storage portion discharge.

Power (hereinafter, called system power) supplied from an electric power company is supplied to the charge system 1. The system power is also supplied to various apparatuses (e.g., an illumination device, an air conditioner, a refrigerator and the like, hereinafter, called a load portion R) in a store and the like provided with the charge system 1 and is consumed.

The charge portion 11 suitably converts (e.g., converts a.c. power into d.c. power, or adjusts a voltage value of d.c. power supplied to the battery B of the electric vehicle C) the system power and the power supplied by a power storage portion discharge from the power storage portion 12, thereby performing the battery charge.

The power storage portion 12 converts (e.g., converts a.c. power into d.c. power, or adjusts a voltage value of the d.c. power) the supplied system power when necessary and performs the power storage portion charge. The power storage portion applies the power storage portion discharge to the power consumed (stored in the power storage portion 12) by the power storage portion charge, thereby supplying the power to the charge portion 11. Here, a structure may be employed, in which the power supplied by the power storage portion discharge is supplied to the load portion R.

The input portion 13 is operated by the user or receives the command transmitted from a user's possession (e.g., a mobile terminal and the like), whereby the user's command is input. Besides, the input portion 13 transmits the input user's command to the control portion 15. As the user's command, for example, there are a command for starting the battery charge, a command for making a reservation for the battery charge, and a command for stopping the battery charge.

The notification portion 14 includes, for example, a display device, a speaker and the like, outputs an image and a voice, or includes a transmission device, and transmits information to the user's possession (e.g., a mobile terminal that is registered beforehand in the charge system 1), thereby giving notice to the user. As the content which the notification portion gives to the user, there are, for example, timing for performing a reserved battery charge, a start, an end and a stop of the battery charge.

The control portion 15 controls the battery charge by the charge portion 11, the power storage portion charge and power storage portion discharge of the power storage portion 12. Upon confirming that the command for making a reservation for the battery charge is input into the input portion 12, the control portion 15 prepares a charge schedule based on the command. And, the control portion 15 controls the notification portion 14, thereby giving notice of part or all of the charge schedule to the user.

Besides, the control portion 15 prepares a charge schedule which allows reduction of a power rate charged to a store and the like without setting a limit on a time zone where to perform the batter charge. And, based on the prepared charge schedule, the control portion controls the operation of the charge portion 11 and the power storage portion 12. In the meantime, details of the charge schedule (i.e., methods for controlling the timing the charge portion 11 performs the battery charge and the timing the power storage portion 12 performs the power storage portion charge and power storage portion discharge) are described later.

The charge schedule can include a start time and an end time of the battery charge. Besides, times at which the power storage portion charge and power storage portion discharge start can be included. The user is notified of the charge schedule by the notification portion 14, thereby recognizing at least the battery charge start time. According to this structure, it becomes possible to alleviate a situation (charge waiting) occurring in which when the user goes to a store and the like to perform the battery charge, other users are already performing the battery charge and the user cannot perform the battery charge early.

Besides, the charge system 1 is able to alleviate the occurrence of charge waiting and decrease the power rate, accordingly, becomes preferable to the user side and the side of a store and the like as well. Because of this, the charge system 1 is expected to become widespread. And, by spreading the charge system 1, it becomes possible to promote the spread of electric vehicles and to achieve reduction in emission amount of carbon dioxide.

Here, the structure of the charge system shown in FIG. 1 is only an example, and another structure may be employed. For example, a structure may be employed, in which the charge system includes another power supply (e.g., a solar battery and the like) that is able to supply power to the charge portion 11, the power storage portion 12, the load portion R and the like.

Besides, the charge portion 11 may be connectable to only one electric vehicle C to which the battery charged is applied, or may be connectable to a plurality of the electric vehicles C. Besides, in a case of the structure in which the charge portion 11 is connectable to the plurality of the electric vehicles C, a structure may be employed, in which the control portion 15 controls the charge portion 11, thereby applying the battery charges to the respective batteries B of the electric vehicles C connected to the charge portion 11 one after another.

<Method for Calculating Power Rate>

Figure 2:
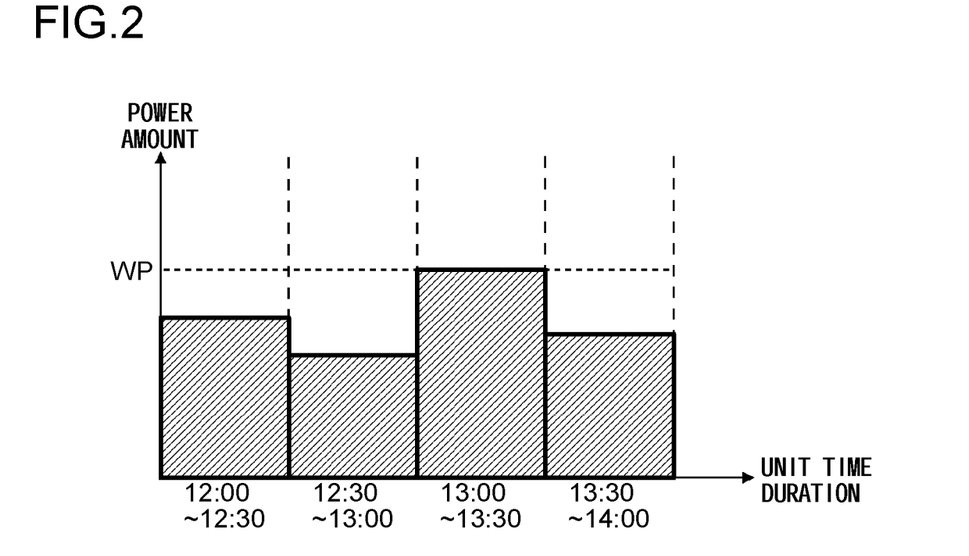
FIG. 2 is a graph showing an overview of a method for calculating a power rate of system power.

Next, a method example for calculating the power rate of the system power is described with reference to drawings. FIG. 2 is a graph showing an overview of the method for calculating the power rate of the system power. Here, the graph shown in FIG. 2 shows, by means of a graph height, the system power amount, which is consumed by the entire store and the like which have the charge system 1, for each of unit time durations (for every 30 minutes of a first half of 00-30 minutes and a second half of 30 to 00 minutes of every hour) of 12:00-12:30, 12:30-13:00, 13:00-13:30, and 13:30-14:00.

The power rate of the system power includes, for example, a fixed basic rate and a measured use rate. Generally, because of a reason for effective power generation (leveled power generation) and the like, an electric power company sets a higher basic rate as the maximum value of the system power amount consumed during a unit time duration becomes larger.

In the example shown in FIG. 2, a power amount WP consumed during a unit time duration of 13:00-13:30 is larger than the power amounts consumed during the other unit time durations, accordingly, becomes the maximum value. Because of this, based on the power amount WP consumed during the unit time duration of 13:00-13:30, the basic rate is set. Here, in FIG. 2, for the sake of simple description, only the four unit time durations are shown; however, a general electric power company calculates the maximum value of the power amounts from more unit time durations (e.g., for one year).

<Charge Schedule>

As described above, by decreasing the maximum value of the system power amount consumed during the unit time duration, it is possible to decrease the power rate (especially, the basic rate, hereinafter, the same applies). Hereinafter, a charge schedule (a control method by which the control portion 15 controls the timing for performing the battery charge) for decreasing the maximum value of the system power amount consumed during the unit time duration is described with reference to drawings. First, for comparison, an undesirable method for controlling the timing for performing the battery charge is described with reference to FIG. 3 and FIG. 4.

Figure 3:
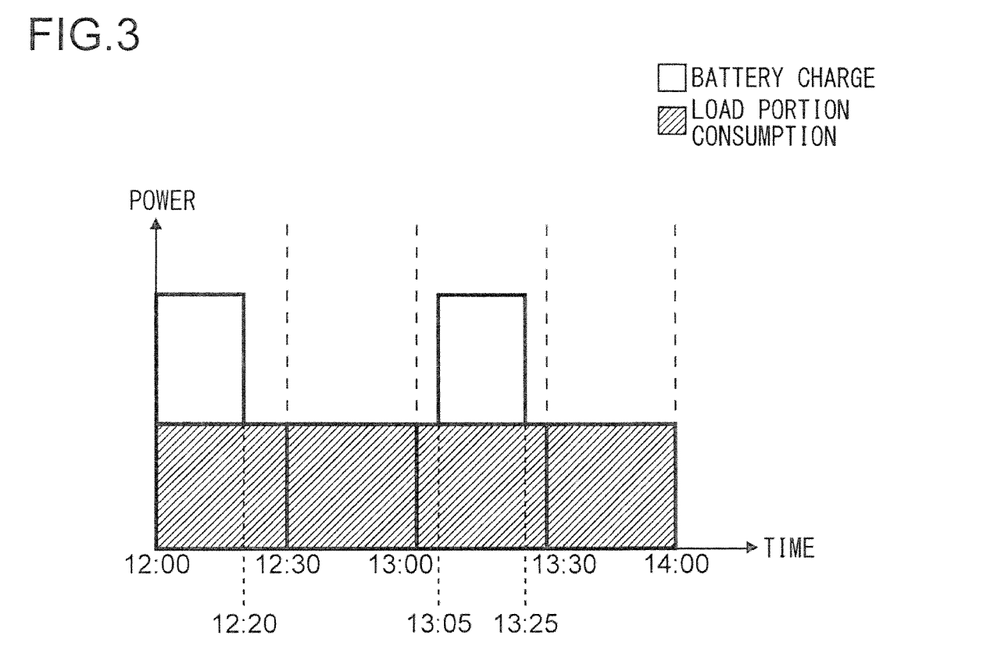
FIG. 3 is a graph showing an example of power that is consumed in a case where timing for performing a battery charge is controlled by an undesirable method.
Figure 4:
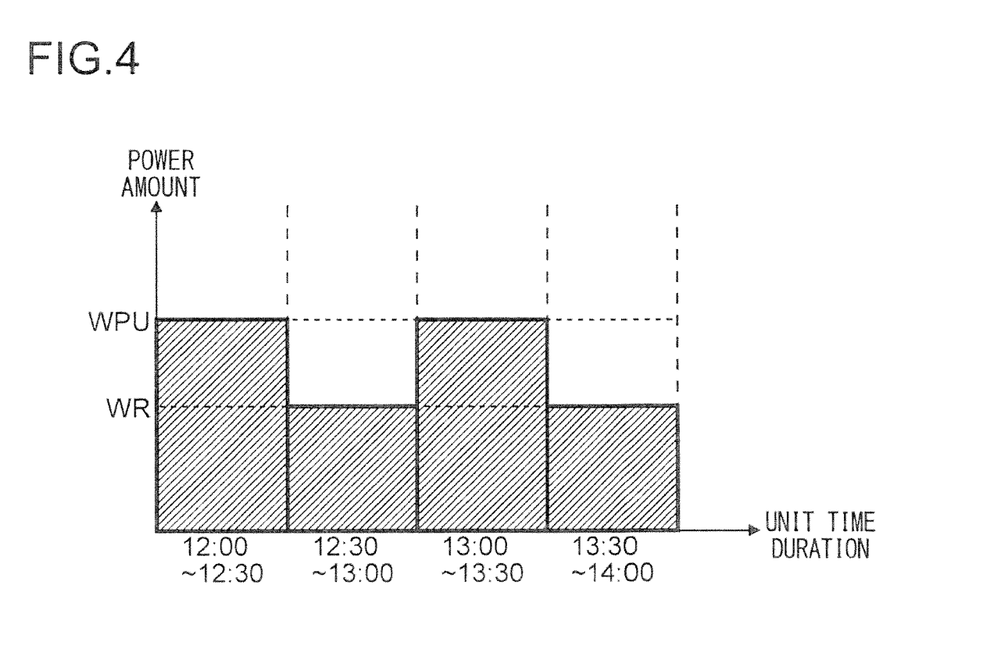
FIG. 4 is a graph showing a system power amount that is consumed during each unit time duration in the case where the timing for performing the battery charge is controlled as shown in FIG. 3.

FIG. 3 is a graph showing an example of the power that is consumed in a case where the timing for performing the battery charge is controlled by an undesirable method. Besides, FIG. 4 is a graph showing the system power amount that is consumed during each unit time duration in the case where the timing for performing the battery charge is controlled as shown in FIG. 3. Both of FIG. 3 and FIG. 4 show the same time duration as the time duration (12:00-14:00) shown in FIG. 2. Besides, in FIG. 3, the size of the system power consumed by the battery charge is shown by means of a height of a white region, while the size of the system power consumed (hereinafter, called load portion consumption) by the load portion R is shown by means of a height of a grey region.

Besides, hereinafter, for the sake of simple description, as shown in FIG. 3, it is assumed that the size of the load portion consumption is constant irrespective of time. Because of this, as shown in FIG. 4, also power amounts WR by the load portion consumption during the respective unit time durations become constant. Besides, as shown in FIG. 3, it is also assumed that the power size, which is consumed (charged into the battery B of the electric vehicle C) by the battery charge, is constant irrespective of time. Further, as shown in FIG. 3, it is assumed that a time duration (a charge time duration for one electric vehicle C) required for one battery charge is a time duration (20 minutes) that is equal to or shorter than the unit time duration (30 minutes) and becomes the same time duration for every charge.

In the example shown in FIG. 3, during a time duration of 12:00-12:20 and during a time duration of 13:05-13:25, the battery charge by the charge portion 11 is performed. Both time durations are confined within the unit time duration (12:00-12:30, 13:00-13:30).

When the battery charge is performed as shown in FIG. 3, the total power amount consumed by one battery charge becomes equal to the system power amount that is consumed by the charge portion 11 during one unit time duration. Especially, according to a rapid charge by which the battery charge is performed during a time duration equal to or shorter than the unit time duration, the consumed power becomes large. Because of this, the system power amount consumed during one unit time duration is likely to become large. Accordingly, as shown in FIG. 4, a system power amount WPU consumed during the unit time duration (12:00-12:30, 13:00-13:30), during which the battery charge is performed, becomes relatively large.

In this case, based on at least the power amount WPU for the unit time duration (12:00-12:30, 13:00-13:30), during which the battery charge is performed, the power rate (basic rate) is set. Accordingly, the power rate is likely to increase.

In contrast to this, a preferred method for controlling the timing for performing the battery charge is described with reference to FIG. 5 and FIG. 6.

Figure 5:
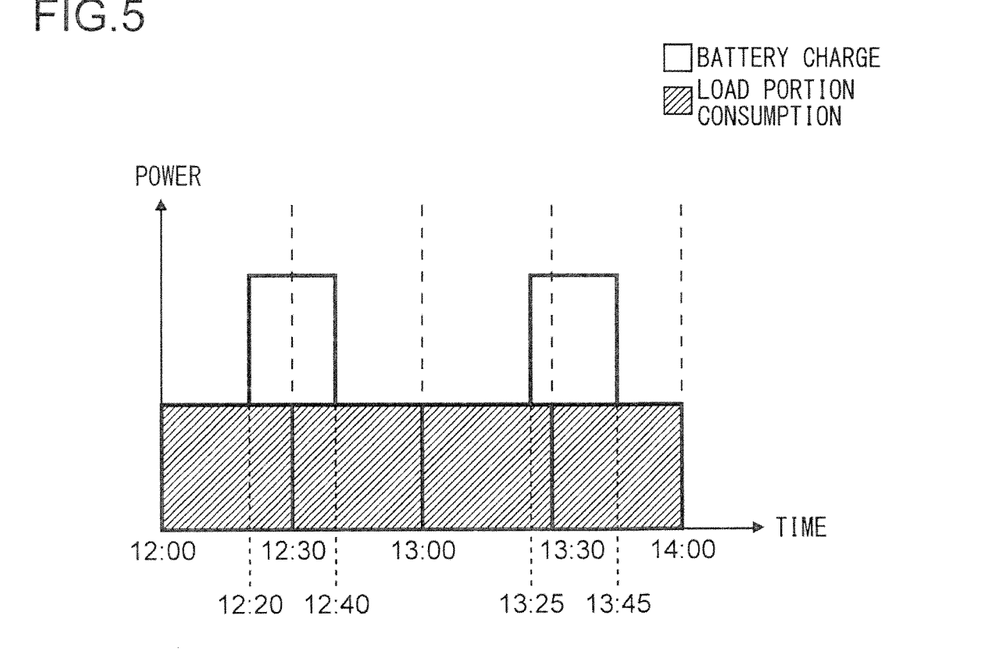
FIG. 5 is a graph showing an example of power that is consumed in a case where the timing for performing a battery charge is controlled by a preferred method.
Figure 6:
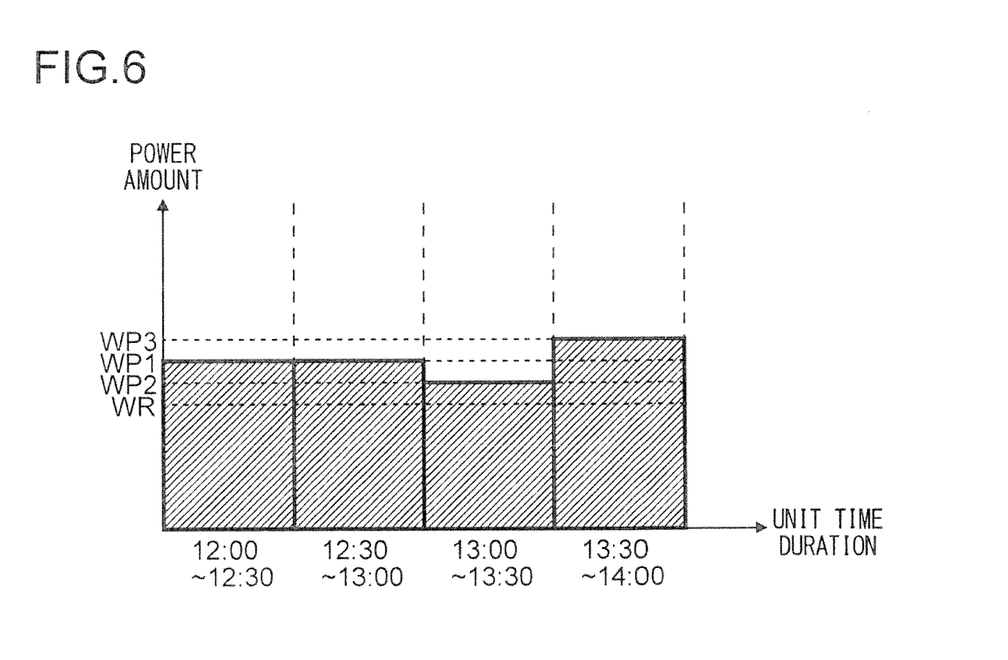
FIG. 6 is a graph showing a system power amount that is consumed during each unit time duration in the case where the timing for performing the battery charge is controlled as shown in FIG. 5.

FIG. 5 is a graph showing an example of the power that is consumed in a case where the timing for performing the battery charge is controlled by means of a preferred method, and corresponds to FIG. 3 that shows the undesirable control method. FIG. 6 is a graph showing a system power amount that is consumed during each unit time duration in the case where the timing for performing the battery charge is controlled as shown in FIG. 5, and corresponds to FIG. 4 that shows the undesirable control method. Here, FIG. 5 is identical to FIG. 3 except that the timing at which the battery charge is performed is different from the timing shown in FIG. 3. Because of this, in FIG. 5, description of the same portions as in FIG. 3 is skipped, and different portions are described in detail.

In the example shown in FIG. 5, during each of a time duration of 12:20-12:40 and a time duration of 13:25-13:45, the battery charge is performed. Both of the time durations during which the battery charge is performed extend into (bridge) the unit time durations (12:00-12:30 and 12:30-13:00, 13:00-13:30 and 13:30-14:00) that are different (do not overlap) from each other.

According to the above structure, even in a case (e.g., a case where a rapid charge is performed) where the power consumed to perform the battery charge during a time duration equal to or shorter than the unit time duration is prone to become large, it becomes possible to distribute the system power amount consumed by one battery charge to the two unit time durations. Because of this, as shown in FIG. 6, it becomes possible to make the system power amounts WP1 to WP3 consumed during the respective unit time durations relatively small. For example, it becomes possible to make them smaller than the power amount WPU shown in FIG. 4. Accordingly, it becomes possible to alleviate the maximum value of the system power amount consumed during the unit time duration, and it becomes possible to decrease the power rate.

Further, it is enough to only slightly change the time duration for performing the battery charge, accordingly, it is not necessary to limit the time zone for performing the battery charge to late night, early morning and the like. Accordingly, it becomes possible to easily decrease the power rate without limiting the time zone for performing the battery charge.

Besides, in a case where the charge portion 11 performs a plurality of the battery charges, the timing for performing each battery charge bridges unit time durations different form each other. Because of this, it becomes possible to alleviate an increase in the system power amount consumed during the unit time durations which is caused by distributing the system power amount, which is consumed by the plurality of the battery charges, to the overlapping unit time durations.

In the meantime, in the battery charge that is performed during the time duration of 12:20-12:40 shown in FIG. 5, the middle time point (12:30) and the time point (12:30) at the boundary between the two unit time durations are substantially equal to each other. According to this structure, it becomes possible to easily distribute the system power amount consumed by the one battery charge substantially equally to the two unit time durations. Because of this, it becomes possible to effectively alleviate the maximum value of the system power amount consumed during the unit time duration (hereinafter, the time duration when the battery charge is performed is called a "reference time duration").

However, because of various circumstances (e.g., a change in the battery charge start time due to a reason of the user), it is hard to perform the control such that the battery charge is surely performed during the reference time duration (in the above example, 20 to 40 minutes (or 50 to 10 minutes of every hour also is all right) of every hour). Besides, if the time duration for performing the battery charge is limited more than necessary, it becomes hard to effectively perform the battery charge.

To avoid this, hereinafter, with reference to FIG. 7 and FIG. 8, a charge schedule (a control method that is performed by the control portion 15 to control the timing for performing the battery charge and the power storage portion discharge) is described which is able to tolerate a change in the time duration for performing the battery charge while effectively alleviating the maximum value of the system power amount consumed during the unit time duration.

Figure 7:
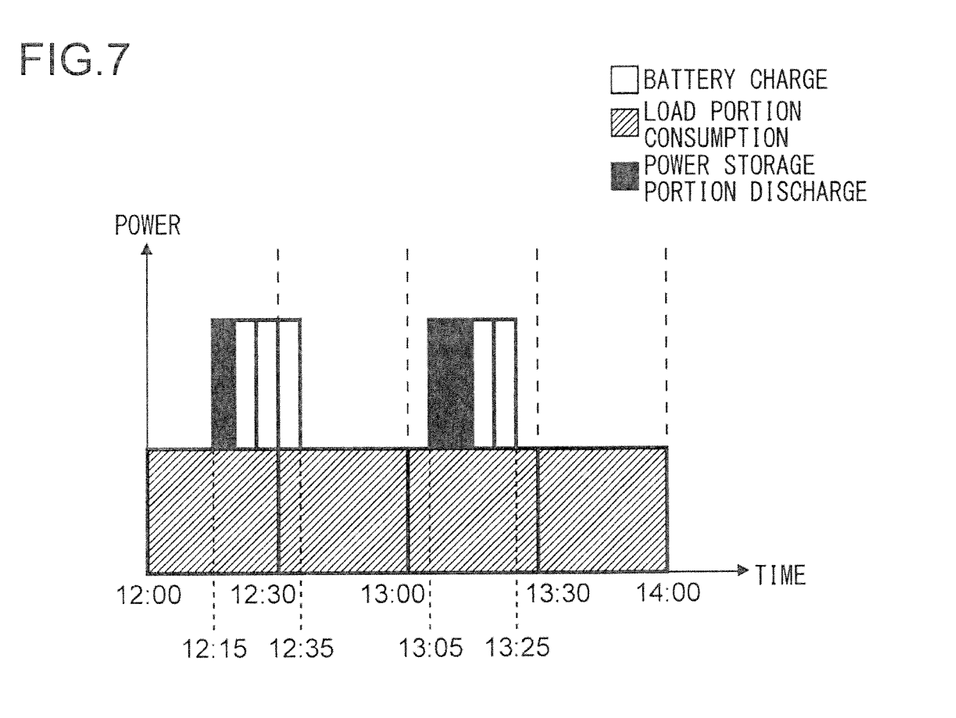
FIG. 7 is a graph showing an example of power that is consumed in a case where timings for performing a battery charge and a power storage portion discharge are controlled by means of a preferred method.

FIG. 7 is a graph showing an example of the power that is consumed in a case where the timing for performing the battery charge and the power storage portion discharge is controlled by means of a preferred method, and corresponds to FIG. 5 that shows the above preferred method. FIG. 8 is a graph showing the system power amount that is consumed during each unit time duration in the case where the timing for performing the battery charge and the power storage portion discharge is controlled as shown in FIG. 7, and corresponds to FIG. 6 that shows the above preferred method. Here, FIG. 7 is identical to FIG. 5 except that the timing for performing the battery charge is different from the timing shown in FIG. 5 and the power supplied by the power storage portion discharge is used for the battery charge. Because of this, in FIG. 7, hereinafter, description of the same portions as in FIG. 5 is skipped, and different portions are described in detail. Here, in FIG. 7, the size of the power, which is supplied by the power storage portion discharge and consumed by the battery charge, is shown by means of a height of a black region.

In the example shown in FIG. 7, during each of a time duration of 12:15-12:35 and a time duration of 13:05-13:25, the battery charge is performed. However, during each of a time duration of 12:15-12:20 and a time duration of 13:05-13:15, not only the system power but also the power supplied by the power storage portion discharge are used to perform the battery charge.

According to the above structure, during each unit time duration, an upper limit (in the present example, half of the system power amount consumed by the one battery charge) is set on the system power amount consumed by the battery charge. Because of this, as shown in FIG. 8, it becomes possible to make the system power amounts WP1, WP2, and WR consumed during the respective unit time durations relatively small. For example, it becomes possible to make them equal to or smaller than the power amount WP1 shown in FIG. 6. Accordingly, it becomes possible to effectively alleviate the maximum value of the system power amount consumed during the unit time duration, and it becomes possible to further decrease the power rate.

Besides, it becomes possible to tolerate a change in the time duration for performing the battery charge by a time duration that corresponds to the power amount suppliable by the power storage portion discharge. For example, if the power amount suppliable by the the power storage portion discharge is equal to ¼ of the power amount consumed by the battery charge, it becomes possible to change the time duration for performing the battery charge by ¼ (in the above example, five minutes) from the reference time duration.

Accordingly, it becomes possible to tolerate the change in the time duration for performing the battery charge while effectively alleviating the maximum value of the system power amount consumed during the unit time duration. Specifically, for example, even if the user changes the time duration for performing the battery charge from the reserved time duration, it becomes possible to effectively decrease the power rate while performing the battery charge during the changed time duration.

Figure 8:
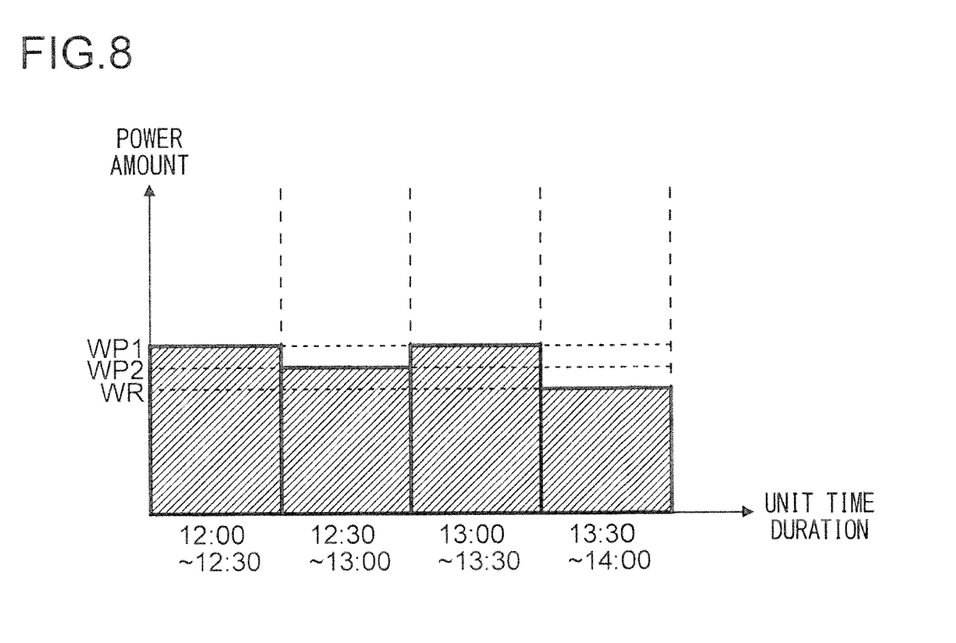
FIG. 8 is a graph showing a system power amount that is consumed during each unit time duration in the case where the timings for performing the battery charge and power storage portion discharge are controlled as shown in FIG. 7.

Besides, in the control methods shown in FIG. 7 and FIG. 8, in a case where a power amount equal to or more than ½ of the power amount consumed by the battery charge is suppliable by the power storage portion discharge, for example, it becomes possible to perform the battery charge during any time duration as shown by the battery charge during the time duration of 13:05-13:25 in FIG. 7.

Here, in FIG. 7, during a predetermined time duration after the start of the battery charge, the power storage portion discharge is performed to supply the power; however, during a predetermined time duration before the end of the battery charge, the power storage portion discharge may be performed to supply the power. Especially, in a case where the time duration for performing the battery charge is moved forward in the reference time duration, as shown in FIG. 7, the power storage portion discharge may be performed during a predetermined time duration after the start of the battery charge, while in a case where the time duration for performing the battery charge is moved backward in the reference time duration, the power storage portion discharge may be performed during a predetermined time duration before the end of the battery charge.

Besides, in FIG. 7, the battery charge consuming the system power and the battery charge consuming the power supplied by the power storage portion discharge are separately performed; however, they may be performed concurrently with each other. Specifically, for example, in the battery charge during the time duration of 12:15-12:35 in FIG. 7, instead of supplying the power from 12:15 to 12:20 by means of the power storage portion discharge, ⅓ of the power may be dispersedly supplied from 12:15 to 12:30.

According to this structure, it becomes possible to make the power supplied by the power storage portion discharge small. Because of this, it becomes possible to alleviate the power storage portion 12 rapidly discharging (or charging) large power and to decrease the burden on the power storage portion 12. Besides, even according to this structure, as described above, it is possible to effectively alleviate the maximum value of the system power amount consumed during the unit time duration.

Besides, in the case where the time duration for performing the battery charge is moved forward in the reference time duration, during the later unit time durations (in the example in FIG. 8, 12:30-13:00, 13:30-14:00), the system power amount consumed by the charge portion 11 is likely to become small. Because of this, during these time durations, the power storage portion charge may be performed by means of the system power.

Besides, the time durations shown in FIG. 5 and FIG. 7 are measured by a watch that comes with a wattmeter and the like installed by an electric power company, and there is a case where a deviation occurs with respect to an actual time. It is preferable that thanks to this deviation, for example, the unit time duration ranges from 10 minutes to 40 minutes and from 40 minutes to 10 minutes of every hour in actual time. In this case, it becomes possible to set the start time of the reference time duration at 0 minutes of every hour (or 30 minutes is all right). Because of this, it becomes possible to set a time, which is clear and easy for the user to memorize, as the start time of the battery charge.

Besides, for the sake of simple description, the size of the power consumed by the battery charge is constant irrespective of time; however, it may not be constant. In this case, to substantially equally distribute the system power amount, which is consumed by the one battery charge, to the two unit time durations, the middle time point of the battery charge may be deviated from the time point at the boundary between the two unit time durations. Besides, also in this case, to simplify the control of the charge portion 11 by the control portion 15, the middle time point of the battery charge and the time point at the boundary between the two unit time durations may be set to become substantially equal to each other.

SPECIFIC EXAMPLES OF CHARGE SCHEDULE

Each specific example of the charge schedule is described hereinafter with reference to drawings. Here, each specific example of the charge schedule described hereinafter uses (controls not only the timing for performing the battery charge but also the timing for performing the power storage portion discharge) the power storage portion discharge as shown FIG. 7 and FIG. 8. Further, each specific example of the charge schedule described hereinafter controls not only the timing for performing the battery charge and power storage portion discharge but also the timing for performing the power storage portion charge.

Besides, each specific example of the charge schedule described hereinafter envisions a case where the charge system 1 needs to frequently perform the battery charge. Specifically, a case is envisioned where the number of unit time durations for the one battery charge is smaller than 2 and it becomes hard to perform, a plurality of times, the battery charge (e.g., see FIG. 5 and FIG. 7) which bridges two unit time durations.

First Specific Example

Figure 9:
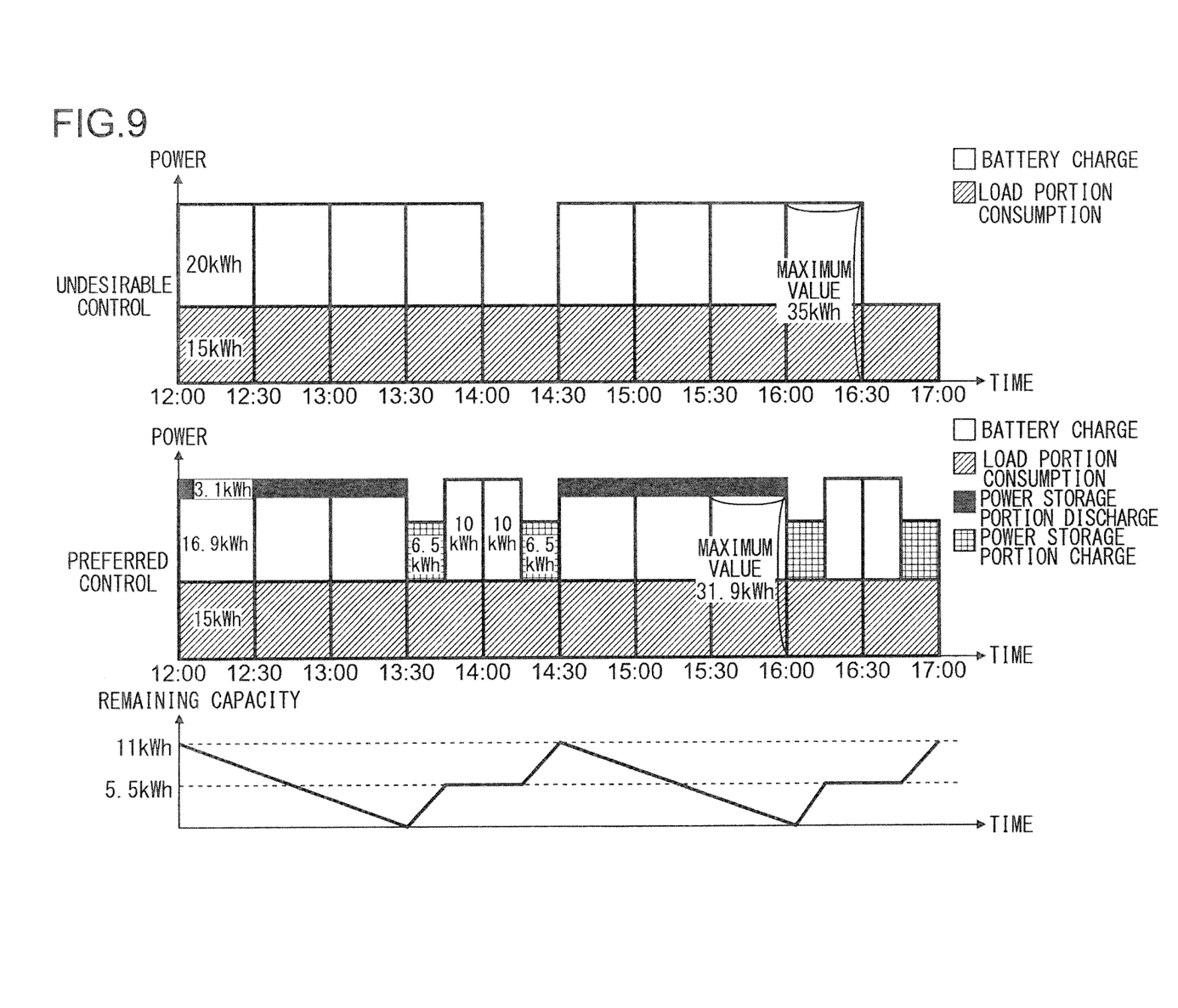
FIG. 9 is a graph showing a first specific example of a charge schedule.

First, a first specific example of the charge schedule is described with reference to FIG. 9. FIG. 9 is a graph showing the first specific example of the charge schedule. A graph on a top stage of FIG. 9 is a graph showing an example of the power that is consumed in a case where the timing for performing the battery charge, the power storage portion discharge and the power storage portion charge is controlled by means of an undesirable method, and corresponds to FIG. 3. A graph on a middle stage of FIG. 9 is a graph showing an example of the power that is consumed in a case where the timing for performing the battery charge, the power storage portion discharge and the power storage portion charge is controlled by means of a preferable method. A graph on a bottom stage of FIG. 9 is a graph showing the power amount (remaining capacity) stored in the power storage portion 12 in a case where the timing for performing the battery charge, the power storage portion discharge and the power storage portion charge is controlled as shown in the graph on the middle stage.

In the graphs on the top and middle stages of FIG. 9, like in FIG. 3, FIG. 5 and FIG. 7, the size of the system power consumed by the battery charge is shown by means of a height of a white region; the size of the system power consumed by the load portion consumption is shown by means of a height of a grey region; and the size of the power supplied by the power storage portion discharge is shown by means of a height of a black region. Further, the size of the system power consumed by the power storage portion charge is shown by means of a height of a region marked by checker-shaped hatching. In insides of some typical regions, the system power amount consumed during the unit time duration and the power amount supplied by the power storage portion discharge during the unit time duration and consumed are represented.

In the present specific example, as shown in the graphs on the top and middle stages of FIG. 9, a case is envisioned where a power amount of 15 kWh is consumed during each unit time duration by the load portion consumption; and a power amount of 20 kWh (which is equal to 80% of the power amount (capacity) that the battery B of the general electric vehicle C is able to charge) is consumed by the one battery charge. Besides, a case is envisioned where four (four electric vehicles C) battery charges are performed within five unit time durations (12:00-14:30, 14:30-17:00); and the one battery charge takes 30 minutes. Besides, a case is envisioned where the power storage portion 12 has a sufficient amount of remaining capacity (11 kWh) at a start time (12:00) of the charge schedule in the present specific example.

As shown in the graph on the top stage of FIG. 9, if each battery charge is performed within each unit time duration like in FIG. 3, the maximum value (in the present specific example, 15+20=35 kWh) of the system power amount consumed during the unit time duration is likely to become large. For example, assuming that the basic rate for one year is obtained by a translated value for one hour of the maximum value (35×2)×a unit price (1600) of the basic rate per month× one year (12), it reaches about 1.34 million yen.

Accordingly, in the present specific example, to decrease the maximum value of the system power amount consumed during the unit time duration, as shown in the graphs on the middle and bottom stages of FIG. 9, the control portion 15 controls the charge portion 11 and the power storage portion 12.

In the present specific example, one of the four battery charges is performed bridging the two unit time durations as described above (see FIG. 5). For example, the last (or first) battery charge of the four is performed bridging the two unit time durations (13:30-14:30, 16:00-17:00). For example, at this time, the middle time point (14:00, 16:30) of the battery charge and the time point (14:00, 16:30) at the boundary between the two unit time durations are made to become substantially equal to each other. According to this, it becomes possible to effectively decrease the maximum value of the system power amount consumed during each of the two unit time durations.

On the other hand, the three battery charges other than the above battery charge are performed during every three unit time durations (12:00-13:30, 14:30-16:00) other than the above two unit time durations (13:30-14:30, 16:00-17:00). Here, the power storage portion discharge is performed during each of the unit time durations. According to this, during each of the unit time durations, for example, a power amount (at a discharge efficiency of 85%, 11÷3×0.85≈3.1 kWh) substantially equal to ⅓ of the remaining capacity of the power storage portion 12 is supplied, and it becomes possible to effectively decrease the maximum value of the system power amount consumed during each of the unit time durations. Here, in the present specific example, the system power amount (15+20−3.1=31.9 kWh) consumed during the unit time duration becomes the maximum value.

Further, in the present specific example, the power storage portion charge is performed during each of the two unit time durations (13:30-14:30, 16:00-17:00) during which the one battery charge is performed. At this time, if the system power amount (11÷0.85÷2≈6.5 kWh in a case of obtaining the remaining capacity of 11 kWh at the charge efficiency of 85% before the power storage portion charge) consumed by the power storage portion charge during each of the two unit time durations is set small such that the system power amount consumed during each of the two unit time durations does not exceed the system power amount (31.9 kWh) consumed during the other unit time durations, it is possible to effectively decrease the maximum value of the system power amount consumed during the unit time duration, which is preferable.

Besides, it is preferable if the system power amount (6.5 kWh) consumed by the power storage portion charge during each of the two unit time durations (13:30-14:30, 16:00-17:00) during which the one battery charge is performed is large such that a sufficient amount of power (3.1 kWh) is suppliable by the power storage portion discharge during the other unit time durations. Here, for example, the power amount for the power storage portion charge and for the power storage portion discharge may be set, or the power storage portion 12 having a capacity, which is able to charge and discharge the power amount, may be selected such that a difference among the system power amounts consumed during the five respective unit time durations during which the four battery charges are performed becomes small.

According to the above structure, the system power amount consumed by the one battery charge is distributed to the two unit time durations. Besides, during the other unit time durations, the battery charge, which consumes the power supplied by the power storage portion discharge, is performed. Because of this, even in a case where it is necessary to frequently perform the battery charge, it becomes possible to decrease the maximum value of the system power amount consumed during the unit time duration. Accordingly, it becomes possible to decrease the power rate. For example, in a case where the basic rate is calculated by means of the above formula, it is possible to decrease the basic rate for one year to about 1.22 million yen.

Besides, it becomes possible to secure the timing for performing the power storage portion charge. Because of this, it becomes possible to alleviate a situation, in which it becomes hard to decrease the maximum value of the system power amount consumed during the unit time duration thanks to a less remaining capacity of the power storage portion 12, occurring.

Second Specific Example

Figure 10:
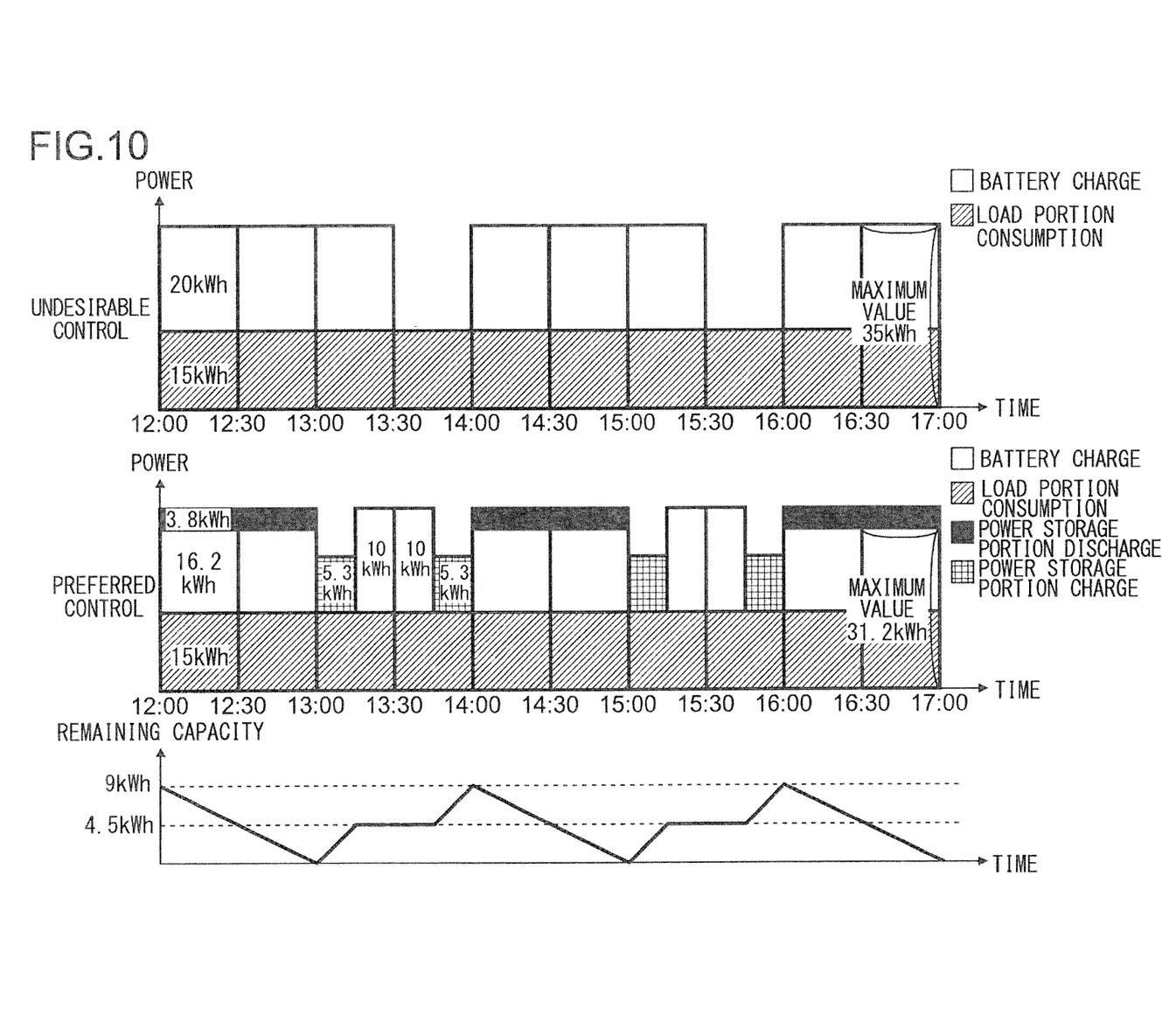
FIG. 10 is a graph showing a second specific example of a charge schedule.

Next, a second specific example of the charge schedule is described with reference to FIG. 10. FIG. 10 is a graph showing the second specific example of the charge schedule. Here, respective graphs on top, middle and bottom stages of FIG. 10 correspond to the respective graphs on the top, middle and bottom stages of FIG. 9 that are shown in the first specific example. Because of this, description of each graph of FIG. 10 is skipped and the description of FIG. 9 is used for it.

In the present specific example, like in the first specific example, a case is envisioned where a power amount of 15 kWh is consumed during each unit time duration by the load portion consumption; and a power amount of 20 kWh is consumed by the one battery charge. Besides, a case is envisioned where the one battery charge takes 30 minutes and the power storage portion 12 has a sufficient amount of remaining capacity (9 kWh) at a start time (12:00) of the charge schedule. Besides, in the present specific example, a case is envisioned where three (three electric vehicles C) battery charges are performed during four unit time durations (12:00-14:00, 14:00-16:00).

As shown in the graph on the top stage of FIG. 10, if each battery charge is performed within each unit time duration like in FIG. 3, the maximum value (in the present specific example, 15+20=35 kWh) of the system power amount consumed during the unit time duration is likely to become large. For example, as described in the first specific example, the basic rate for one year reaches about 1.34 million yen.

Accordingly, in the present specific example, to decrease the maximum value of the system power amount consumed during the unit time duration, as shown in the graphs on the middle and bottom stages of FIG. 10, the control portion 15 controls the charge portion 11 and the power storage portion 12.

In the present specific example, one of the three battery charges is performed bridging the two unit time durations as described above (see FIG. 5). For example, the last (or first) battery charge of the three is performed bridging the two unit time durations (13:00-14:00, 15:00-16:00). For example, at this time, the middle time point (13:30, 15:30) of the battery charge and the time point (13:30, 15:30) at the boundary between the two unit time durations are made to become substantially equal to each other. According to this, it becomes possible to effectively decrease the maximum value of the system power amount consumed during each of the two unit time durations.

On the other hand, the two battery charges other than the above battery charge are performed during every two unit time durations (12:00-13:00, 14:00-15:00) other than the above two unit time durations (13:00-14:00, 15:00-16:00). Here, the power storage portion discharge is performed during each of the unit time durations. According to this, during each of the unit time durations, for example, a power amount (at a discharge efficiency of 85%, 9÷2×0.85≈3.8 kWh) substantially equal to ½ of the remaining capacity of the power storage portion 12 is supplied, and it becomes possible to decrease the maximum value of the system power amount consumed during each of the unit time durations. Here, in the present specific example, the system power amount (15+20−3.8=31.2 kWh) consumed during the unit time duration becomes the maximum value.

Further, in the present specific example, the power storage portion charge is performed during each of the two unit time durations (13:00-14:00, 15:00-16:00) during which the one battery charge is performed. At this time, if the system power amount (9÷0.85÷2≈5.3 kWh in a case of obtaining the remaining capacity of 9 kWh at the charge efficiency of 85% before the power storage portion discharge) consumed by the power storage portion charge during each of the two unit time durations is set small such that the system power amount consumed during each of the two unit time durations does not exceed the system power amount (31.2 kWh) consumed during the other unit time durations, it is possible to effectively decrease the maximum value of the system power amount consumed during the unit time duration, which is preferable.

Besides, it is preferable if the system power amount (5.3 kWh) consumed by the power storage portion charge during each of the two unit time durations (13:00-14:00, 15:00-16:00) during which the one battery charge is performed is large such that a sufficient amount of power (3.8 kWh) is suppliable by the power storage portion discharge during the other unit time durations. Here, for example, the power amount for the power storage portion charge and for the power storage portion discharge may be set, or the power storage portion 12 having a capacity, which is able to charge and discharge the power amount, may be selected such that a difference among the system power amounts consumed during the four respective unit time durations during which the three battery charges are performed becomes small.

According to the above structure, the system power amount consumed by the one battery charge is distributed to the two unit time durations. Besides, during the other unit time durations, the battery charge, which consumes the power supplied by the power storage portion discharge, is performed. Because of this, even in a case where it is necessary to frequently perform the battery charge, it becomes possible to decrease the maximum value of the system power amount consumed during the unit time duration. Accordingly, it becomes possible to decrease the power rate. For example, in a case where the basic rate is calculated by means of the above formula, it is possible to decrease the basic rate for one year to about 1.20 million yen.

Besides, it becomes possible to secure the timing for performing the power storage portion charge. Because of this, it becomes possible to alleviate a situation, in which it becomes hard to decrease the maximum value of the system power amount consumed during the unit time duration thanks to a less remaining capacity of the power storage portion 12, occurring.

Besides, in the present specific example, in comparison with the first specific example, the number of battery charges able to be performed during a predetermined time duration decreases, however, it becomes possible to dramatically decrease the power rate. Besides, in the present specific example, even the capacity of the power storage portion 12 smaller than the first specific example is sufficient, accordingly, it becomes possible to achieve simplification of the structure of and low cost of the charge system 1.

Third Specific Example

Figure 11:
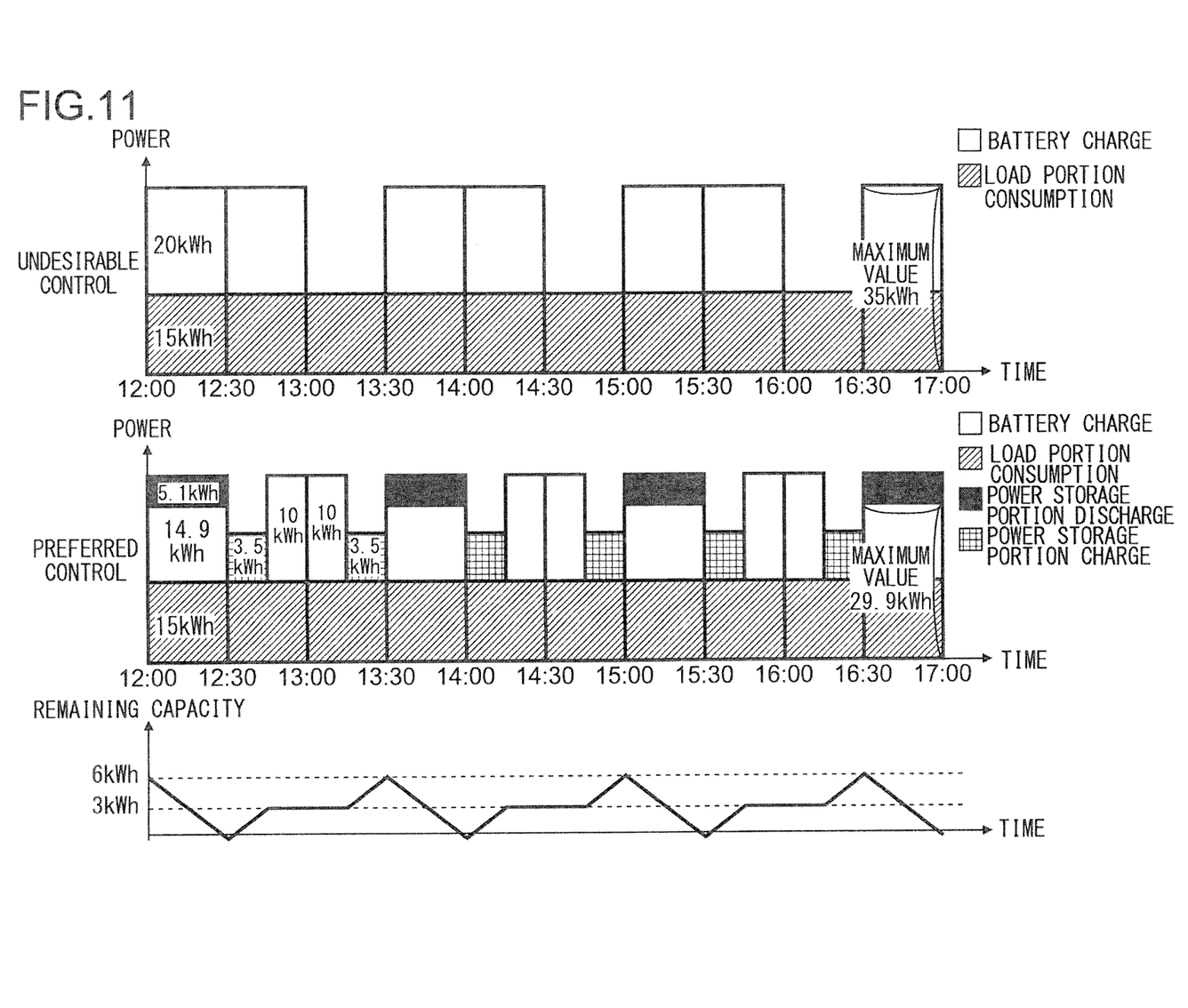
FIG. 11 is a graph showing a third specific example of a charge schedule.

Next, a third specific example of the charge schedule is described with reference to FIG. 11. FIG. 11 is a graph showing the third specific example of the charge schedule. Here, respective graphs on top, middle and bottom stages of FIG. 11 correspond to the respective graphs on the top, middle and bottom stages of FIG. 9 that are shown in the first specific example. Because of this, description of each graph of FIG. 11 is skipped and the description of FIG. 9 is used for it.

In the present specific example, like in the first specific example, a case is envisioned where a power amount of 15 kWh is consumed during each unit time duration by the load portion consumption; and a power amount of 20 kWh is consumed by the one battery charge. Besides, a case is envisioned where the one battery charge takes 30 minutes and the power storage portion 12 has a sufficient amount of remaining capacity (6 kWh) at a start time (12:00) of the charge schedule. Besides, in the present specific example, a case is envisioned where two (two electric vehicles C) battery charges are performed within three unit time durations (12:00-13:30, 13:30-15:00, 15:00-16:30).

As shown in the graph on the top stage of FIG. 11, if each battery charge is performed within each unit time duration like in FIG. 3, the maximum value (in the present specific example, 15+20=35 kWh) of the system power amount consumed during the unit time duration is likely to become large. For example, as described in the first specific example, the basic rate for one year reaches about 1.34 million yen.

Accordingly, in the present specific example, to decrease the maximum value of the system power amount consumed during the unit time duration, as shown in the graphs on the middle and bottom stages of FIG. 11, the control portion 15 controls the charge portion 11 and the power storage portion 12.

In the present specific example, one of the two battery charges is performed bridging the two unit time durations as described above (see FIG. 5). For example, either of the two battery charges is performed bridging the two unit time durations (12:30-13:30, 14:00-15:00, 15:30-16:30). For example, at this time, the middle time point (13:00, 14:30, 16:00) of the battery charge and the time point (13:00, 14:30, 16:00) at the boundary between the two unit time durations are made to become substantially equal to each other. According to this, it becomes possible to effectively decrease the maximum value of the system power amount consumed during each of the two unit time durations.

On the other hand, the one battery charge other than the above battery charge is performed during the one unit time duration (12:00-12:30, 13:30-14:00, 15:00-15:30) other than the above two unit time durations (12:30-13:30, 14:00-15:00, 15:30-16:30). Here, the power storage portion discharge is performed during the unit time duration. According to this, during the unit time duration, for example, a power amount (at a discharge efficiency of 85%, 6×0.85≈5.1 kWh) substantially equal to the remaining capacity of the power storage portion 12 is supplied, and it becomes possible to decrease the maximum value of the system power amount consumed during each of the unit time durations. Here, in the present specific example, the system power amount (15+20−5.1=29.9 kWh) consumed during the unit time duration becomes the maximum value.

Further, in the present specific example, the power storage portion charge is performed during each of the two unit time durations (12:30-13:30, 14:00-15:00, 15:30-16:30) during which the one battery charge is performed. At this time, if the system power amount (6÷0.85÷2≈3.5 kWh in a case of obtaining the remaining capacity of 6 kWh at the charge efficiency of 85% before the power storage portion discharge) consumed by the power storage portion charge during each of the two unit time durations is set small such that the system power amount consumed during each of the two unit time durations does not exceed the system power amount (29.9 kWh) consumed during the other unit time durations, it is possible to effectively decrease the maximum value of the system power amount consumed during the unit time duration, which is preferable.

Besides, it is preferable if the system power amount (3.5 kWh) consumed by the power storage portion charge during each of the two unit time durations (12:30-13:30, 14:00-15:00, 15:30-16:30) during which the one battery charge is performed is large such that a sufficient amount of power (5.1 kWh) is suppliable by the power storage portion discharge during the other unit time durations. Here, for example, the power amount for the power storage portion charge and for the power storage portion discharge may be set, or the power storage portion 12 having a capacity, which is able to charge and discharge the power amount, may be selected such that a difference among the system power amounts consumed during the three respective unit time durations during which the two battery charges are performed becomes small.

According to the above structure, the system power amount consumed by the one battery charge is distributed to the two unit time durations. Besides, during the other unit time durations, the battery charge, which consumes the power supplied by the power storage portion discharge, is performed. Because of this, even in a case where it is necessary to frequently perform the battery charge, it becomes possible to decrease the maximum value of the system power amount consumed during the unit time duration. Accordingly, it becomes possible to decrease the power rate. For example, in a case where the basic rate is calculated by means of the above formula, it is possible to decrease the basic rate for one year to about 1.15 million yen.

Besides, it becomes possible to secure the timing for performing the power storage portion charge. Because of this, it becomes possible to alleviate a situation, in which it becomes hard to decrease the maximum value of the system power amount consumed during the unit time duration thanks to a less remaining capacity of the power storage portion 12, occurring.

Besides, in the present specific example, in comparison with the first and second specific examples, the number of battery charges able to be performed during a predetermined time duration decreases, however, it becomes possible to more dramatically decrease the power rate. Besides, in the present specific example, even the capacity of the power storage portion 12 smaller than the first and second specific examples is sufficient, accordingly, it becomes possible to achieve simplification of the structure of and low cost of the charge system 1.

Here, by construing the charge schedules in the above first to third specific examples as being "performing n battery charges during n+1 unit time durations," the control portion 15 may prepare n (≥5) charge schedules like in the first to third specific examples (n=4 to 2). Here, n is an integer that is 2 or larger. It may be understood as one set that the control portion 15 "performs n battery charges during n+1 unit time durations." For example, by understanding a reservation for the battery charge input from the user via the input portion 13 as a combination of some sets, a charge schedule combining control methods (e.g., see FIG. 9 to FIG. 11) corresponding to the respective sets may be prepared.

Besides, the power storage portion charge may be performed in any way during two unit time durations during which the one battery charge is performed. An execution example of this power storage portion charge is described with reference to FIG. 12. FIG. 12 is a graph showing the execution example of the power storage portion charge. Besides, FIG. 12 corresponds to the graph on the middle stage of FIG. 9. Because of this, description of the graph of FIG. 12 is skipped and the description of the graph on the middle stage of FIG. 9 is used for it.

Figure 12A:
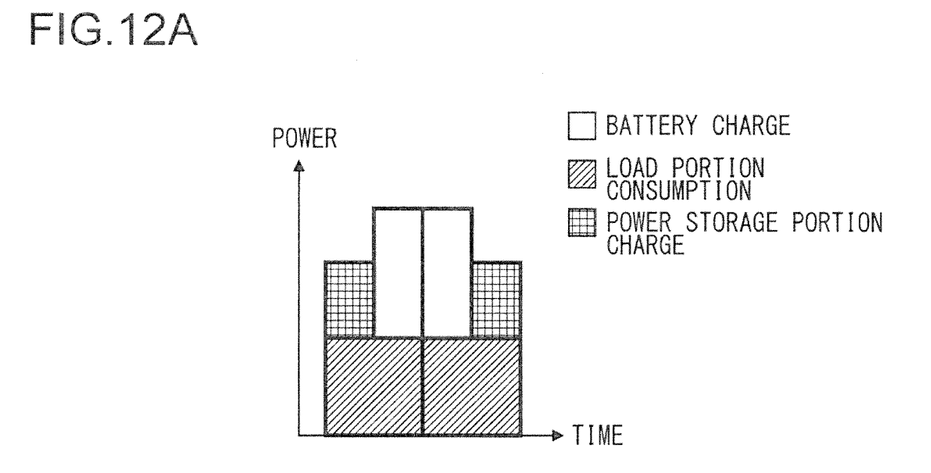
FIG. 12 is a graph showing an execution example of a power storage portion charge.

FIG. 12(a) is the same as that shown in the graph on the middle stage of each of FIG. 9 to FIG. 11. Specifically, during the two unit time durations, the power storage portion charge is performed by one before and after the one battery charge that is performed bridging the two unit time durations.

Figure 12B:
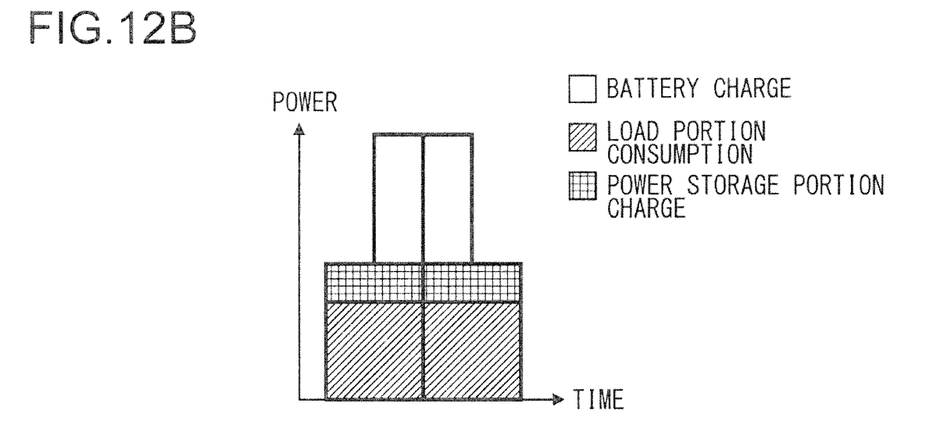

In contrast to this, in FIG. 12(b), the power storage portion charge is performed by one irrespective of presence of the battery charge. Besides, the power storage portion charge in the present example is performed bridging the two unit time durations.

In any of FIGS. 12(a) and (b), the system power amounts consumed during the respective unit time durations become equal to each other. However, in the power storage portion charge in FIG. 12(a), it is alleviated that the battery charge and the power storage portion charge overlap each other, accordingly, it becomes possible to decrease the maximum value of the consumed system power. On the other hand, in FIG. 12(b), it alleviated that the power storage portion charge is divided by the battery charge, accordingly, it becomes possible to continuously perform the power storage portion charge at a time.

Besides, the case is described as an example in which the power storage portion charge is performed during the two unit time durations during which the one battery charge is performed; however, the power storage portion charge may be performed during either one. However, from the viewpoint of decreasing the system power amount consumed during the unit time duration, it is preferable to perform the power storage portion charge bridging the two unit time durations like the battery charge.

To achieve the above object, a charge system according to the present disclosure is a charge system that charges a battery and includes: a power storage portion that stores system power supplied from an electric power company and discharges stored power; a charge portion that charges the battery by means of system power sup lied from the electric power company or the power charged in the power storage portion; and a ontrol portion that controls a charge into the battery by the charge portion, a charge and a disch rge of the power storage portion; wherein in a case where a higher power rate is set as a consumption amount of the system power per each unit time duration becomes larger, the control portion uses the system power supplied from the electric power company to start at least one charge, which is performed from the charge portion into the battery, within a first unit time duration, thereafter, ends the at least one charge within a second unit time duration that follows the first unit time duration, and uses the system power supplied from the electric power company to charge the power storage portion within at least one time span of a time span from a start time point of the first unit time duration to a start time point of the battery charge and a time span from an end time point of the battery charge to an end time point of the second unit time duration.

Besides, in the charge system having the above structure, the power rate set by the electric power company may include a fixed basic rate and a measured use rate, and the basic rate may become higher as the maximum value of the power amount supplied during the unit time duration becomes larger.

Besides, in the charge system having the above structure, the charge of the power storage portion may be performed during at least one of the two unit time durations during which the one charge of the charge system is performed.

According to this structure, it becomes possible to secure timing to perform the charge of the power storage portion. Because of this, it becomes possible to alleviate a situation, in which it becomes hard to decrease the maximum value of the system power amount consumed during the unit time duration thanks to a less remaining capacity of the power storage portion, occurring.

Besides, in the charge system having the above structure, in a case where the charge portion performs n (n is an integer that is 2 or larger) charges, each of which takes a time duration equal to or shorter than the unit time duration, during n+1 unit time durations, the one charge of the charge portion may be performed bridging the two unit time durations and other n−1 charges may be performed during each of n−1 unit time durations other than the two unit time durations.

According to this structure, even in a case where the number of unit time durations for the one charge by the charge portion is smaller than 2 and it becomes hard to perform, a plurality of times, the charge of the charge portion which bridges the two unit time durations, it becomes possible to decrease the maximum value of the system power amount that is consumed during the unit time duration.

Besides, in the charge system having the above structure, the system power amount, which is consumed during each of the two unit time durations during which the one charge of the charge portion is performed, may not exceed the system power amount that is consumed during the other unit time durations.

According to this structure, it becomes possible to effectively decrease the maximum value of the system power amount that is consumed during the unit time duration.

Besides, in the charge system having the above structure, the charge of the power storage portion may be performed by one each before and after the one charge during the two unit time durations during which the one charge of the charge portion is performed.

According to this structure, it is alleviated that the charge by the charge portion and the charge of the power storage portion overlap each other, accordingly, it becomes possible to decrease the maximum value of the consumed system power.

Besides, in the charge system having the above structure, one charge of the power storage portion may be performed during the two unit time durations during which the one charge of the charge portion is performed.

According to this structure, it is alleviated that the charge of the power storage portion is divided by the charge by the charge portion, accordingly, it becomes possible to continuously perform the charge of the power storage portion at a time.

Besides, in the charge system having the above structure, a middle time point of at least one charge of the charge portion and a time point at a boundary between the two unit time durations may be made to become substantially equal to each other.

According to this structure, it becomes possible to effectively decrease the maximum value of the system power amount that is consumed during the two unit time durations.

Besides, in the charge system having the above structure, in a case where a plurality of the charges are performed by the charge portion, the unit time durations during which the respective charges are performed may be different from one another.

According to this structure, it is alleviated that the system power amounts consumed by the plurality of the charges of the charge portions overlap one another during a unit time duration. Because of this, it becomes possible to alleviate that the system power amount consumed during the unit time duration increases.

<Modifications>

Instead of (or in addition to) the power supplied by the power storage portion discharge being consumed for the battery charge, the power may be consumed for the load portion consumption.

In the charge system 1 according to the embodiments of the present invention, the operation of part or all of portions such as the control portion 15 and the like may be performed by a control device such as a micro-computer and the like. Further, by writing all or part of the functions achieved by such a control device as a program and performing the program on a program execution device (e.g., a computer), all or part of the functions may be achieved.

In addition, besides the above cases, the charge system 1 shown in FIG. 1 is achievable by hardware or a combination of hardware and software. Besides, in the case where part of the charge system is composed by means of software, a block related to the part achieved by the software represents a function block of the part.

Hereinbefore, the embodiments of the present invention are described; however, the scope of the present invention is not limited to these embodiments, and it is possible to add various modifications without departing the spirit of the present invention and put them into practical use.

INDUSTRIAL APPLICABILITY

The present invention is applicable to a charge system that charges a battery and the like which are disposed in an electric vehicle. Especially, it is preferable to apply the present invention to a charge system that consumes large power and is able to perform a rapid charge during a time duration which is equal to or shorter than a unit time duration.

REFERENCE SIGNS LIST 1 charge system
11 charge portion
12 power storage portion
13 input portion
14 notification portion
15 control portion
B battery
C electric vehicle
R load portion

What is claimed is:

1. A charge system that charges a battery, comprising:
a power storage portion that stores system power supplied from an electric power company and discharges stored power;
a charge portion that charges the battery by means of system power supplied from the electric power company or the power charged in the power storage portion; and
a control portion that controls a charge into the battery by the charge portion, a charge and a discharge of the power storage portion; wherein
in a case where a higher power rate is set as a consumption amount of the system power per each unit time duration becomes larger, the control portion uses the system power supplied from the electric power company to start at least one charge, which is performed from the charge portion into the battery, within a first unit time duration, thereafter, ends the at least one charge within a second unit time duration that follows the first unit time duration, and
uses the system power supplied from the electric power company to charge the power storage portion within at least one time span of a time span from a start time point of the first unit time duration to a start time point of the battery charge and a time span from an end time point of the battery charge to an end time point of the second unit time duration.

2. The charge system according to claim 1, wherein the control portion charges the power storage portion in a range where a system power amount consumed during each of the first unit time duration and the second unit time duration becomes smaller than a system power amount consumed during another unit time duration.

3. The charge system according to claim 1, wherein the control portion supplies power to the battery or a load by performing a discharge from the power storage portion during another unit time duration that is different from the first unit time duration and the second unit time duration.

4. The charge system according to claim 1, wherein the control portion charges a power amount, which is discharged from the power storage portion before the first unit time duration starts, into the power storage portion.

5. The charge system according to claim 1, wherein in a case where the charge portion performs n (n is an integer that is 2 or larger) charges, which start and end within one unit time duration, during n+1 unit time durations, the at least one charge is performed bridging two unit time durations, and n−1 other charges are performed during each of n−1 unit time durations other than the two unit time durations.

* * * * *